United States Patent [19]

Kinoshita et al.

[11] Patent Number: 5,026,251
[45] Date of Patent: Jun. 25, 1991

[54] COMPACT FAN UNIT FOR AUTOMOBILE

[75] Inventors: Tsutomu Kinoshita, Kosai; Toshihiko Osakabe, Hamamatsu, both of Japan

[73] Assignee: Asmo Co., Ltd., Japan

[21] Appl. No.: 379,436

[22] Filed: Jul. 12, 1989

[30] Foreign Application Priority Data

Jul. 14, 1988 [JP] Japan .................................. 63-92404

[51] Int. Cl.$^5$ ................................................ F01D 5/00
[52] U.S. Cl. ..................................... 415/119; 415/206; 415/208.1; 416/203; 416/223 B
[58] Field of Search ............ 415/119, 203, 206, 208.1; 416/223 B, 203, 175 R

[56] References Cited

U.S. PATENT DOCUMENTS

| | | | |
|---|---|---|---|
| 1,246,090 | 11/1917 | Hagen | 415/119 |
| 3,398,866 | 8/1968 | Flame et al. | 415/119 |
| 4,253,800 | 3/1981 | Segawa et al. | 415/119 |
| 4,627,793 | 12/1986 | Kuroyanagi et al. | 417/203 |
| 4,767,285 | 8/1988 | Jyoraku et al. | 415/119 |

FOREIGN PATENT DOCUMENTS

| | | | |
|---|---|---|---|
| 472199 | 12/1952 | Italy | 416/223 B |
| 0106397 | 10/1986 | Japan | 415/206 |
| 583664 | 12/1946 | United Kingdom | 415/119 |
| 1293553 | 10/1972 | United Kingdom | 416/203 |

*Primary Examiner*—Edward K. Look
*Assistant Examiner*—Hoang Nguyen
*Attorney, Agent, or Firm*—Bruce L. Adams; Van C. Wilks

[57] ABSTRACT

An improved compact automobile fan unit of the type including a turbofan fixedly mounted on the drive shaft of a motor and having a plurality of backwardly curved blades, and a generally cup-shaped housing having intake openings in its end wall and discharge openings in its side wall and secured to a yoke of the motor for containing therein the turbofan, wherein the backwardly curved blades are circumferentially spaced at different angular intervals and the turbofan has a center of gravity located at an axis of the drive shaft. With the blades thus arranged, the fan unit is capable of operating at high speeds with large capacity without generating unpleasant noise.

16 Claims, 7 Drawing Sheets

COMPACT FAN UNIT FOR AUTOMOBILE

BACKGROUND OF THE INVENTION

1. Field of the Invention

The present invention relates to compact fan units for automobiles, and more particularly to a low-noise compact automobile fan unit.

2. Description of the Prior Art

Automobiles having an air conditioner unit generally include a temperature sensor such as a thermistor for detecting the temperature of air in the vehicle compartment, and a compact fan unit for circulating air to provide a uniform temperature distribution within the vehicle compartment. The temperature sensor is disposed at a proper position in a path of circulation of air so as to avoid a local air temperature detection.

The reliability of the above-mentioned temperature detection can be improved by increasing the rate of flow of the compact fan unit. Since the fan unit is disposed within the vehicle compartment, it is desired to increase the flow rate of the fan unit without increasing the size of the fan unit. The flow rate of the fan unit increases as the rotational speed of the fan unit is increased. However, a problem is found that increasing the rotational speed of the conventional fan unit raises the fan noise from about 35dB(A) to about 50dB(A) which is almost the upper limit of a required noise level for the vehicle compartment. Consequently, the conventional fan unit does not satisfy an increasing recent demand for a silent vehicle compartment.

SUMMARY OF THE INVENTION

With the foregoing difficulties in view, it is an object of the present invention to provide a compact fan unit for automobiles which is capable of operating at high speeds to increase the rate of flow without increasing the overall size of the fan unit.

Another object of the present invention is to provide a compact automobile fan unit capable of operating at low noise and vibration.

According to the present invention, there is provided a compact automobile fan unit comprising: a motor having yoke and a drive shaft rotatably supported at its one end by the yoke; a turbofan fixedly mounted on the drive shaft for co-rotation therewith and having a plurality of blades curving in a direction opposite to the direction of rotation of the turbofan, the blades being circumferentially spaced at different angular intervals, the turbofan having a center of gravity located at an axis of the drive shaft; and a substantially cup-shaped housing connected to the yoke of the motor and containing the turbofan, the housing includes an end wall having at least one intake opening and a side wall having at least one discharge opening.

The blades are arranged in a pattern obtained by a combination of a pair of blades circumferentially equidistant from one another and a set of three blades circumferentially equidistant from one another. According to a preferred embodiment, the number of the blades is twelve and the twelve blades are arranged in a pattern obtained by a combination of three of the blade pair and two of the blade set. According to another preferred embodiment, the number of the blades are ten and ten blades are arranged in a pattern obtained by a combination of two of the blade pair and two of the blade set.

The housing includes a plurality of circumferentially spaced side columns defined therebetween the discharge opening, each of the side columns having an oblique side surface sloping in the direction of rotation of the turbofan.

The turbofan having such inequidistantly arranged, backwardly curved blades is capable of operating silently without generating unpleasant noise, so-called aeolian tones which may be produced in the case of the conventional fan unit due to Karman vortex streets created in the vicinity of discharge openings. According to the present invention, the formation of the Karman vortex streets can be completely prevented by the inequidistant arrangement of the blades of the present invention. The fan noise and vibration can be substantially reduced because the center of gravity of the turbofan is coincident with the axis of rotation of the turbofan and hence the turbofan has a proper balancing notwithstanding of the inequidistant arrangement of the blades.

Further, since the oblique side surfaces on the respective side columns sloping in the direction of rotation of the turbofan substantially reduce a flow resistance to air, air being discharged from the housing moves smoothly through the discharge openings without loss.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIGS. 1E(a) and 1E(b) are diagrammatical views showing two basic blade patterns for a fan of the fan unit;

DETAILED DESCRIPTION

The present invention will be described hereinbelow in detail with reference to certain preferred, but not limited, embodiments shown in the accompanying drawings.

Figure 1A:
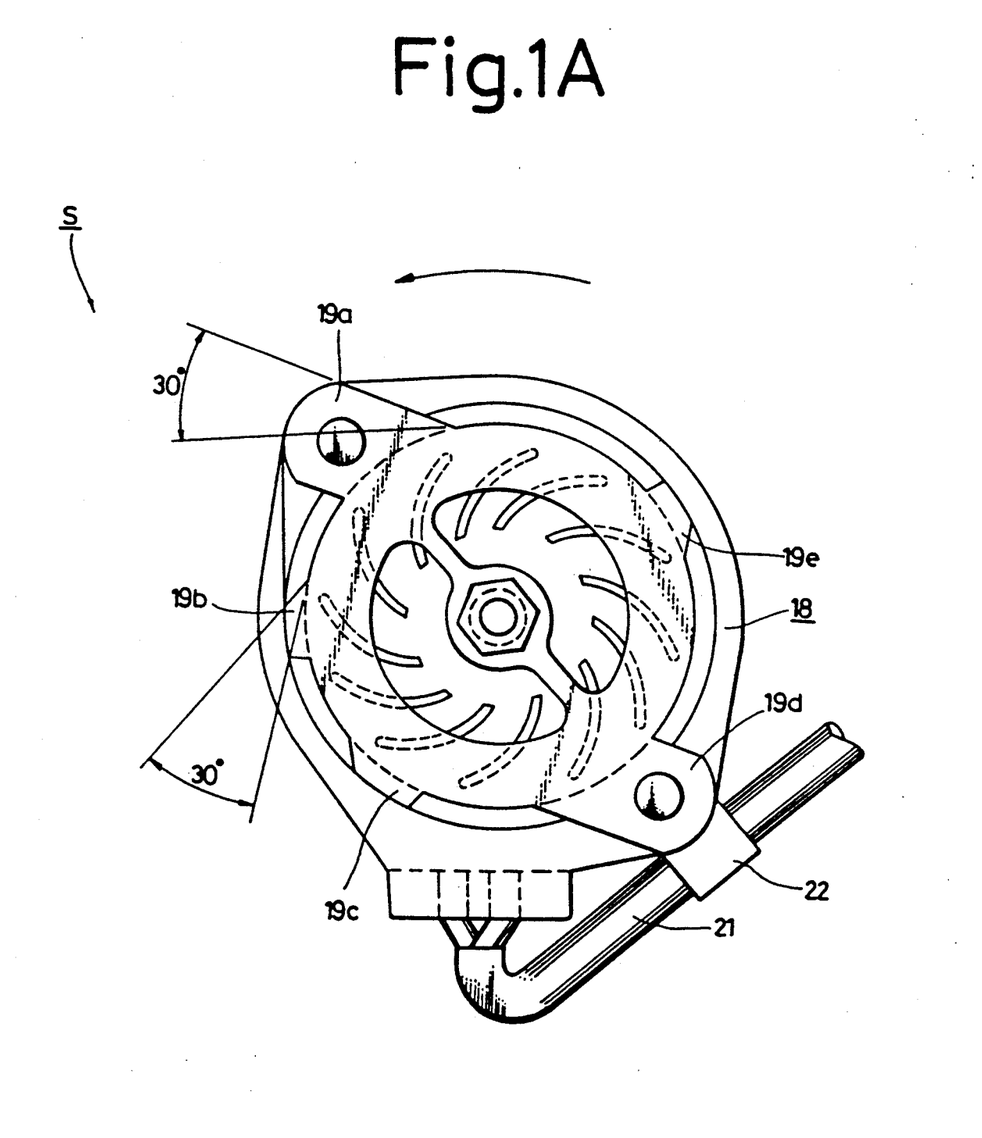
FIG. 1A is a schematic plan view of a compact automobile fan unit according to the present invention.
Figure 1B:
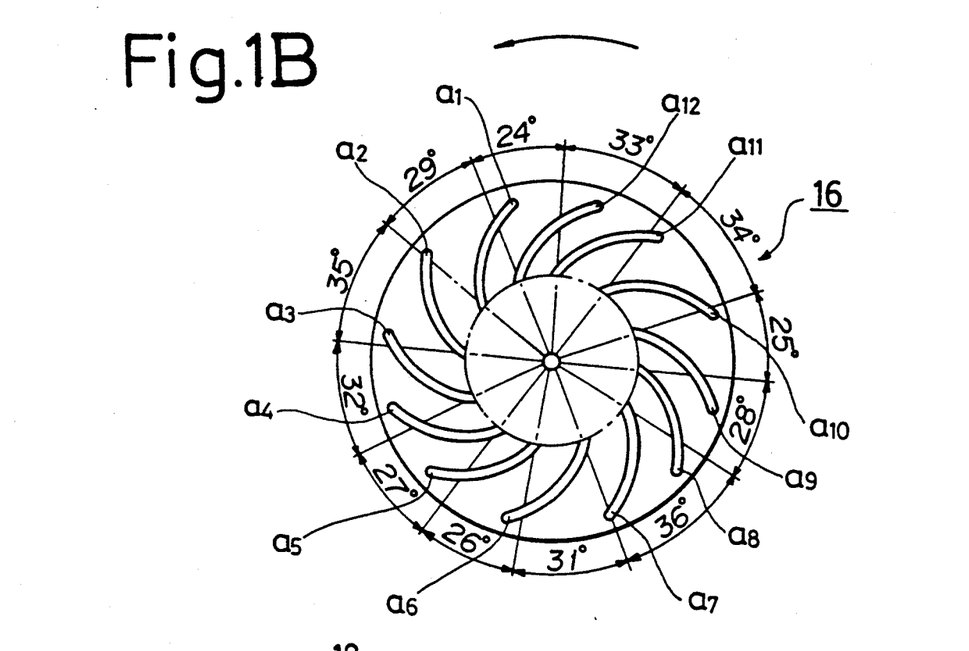
FIG. 1B is a diagrammatical view showing a blade design of the fan unit.
Figure 1C:
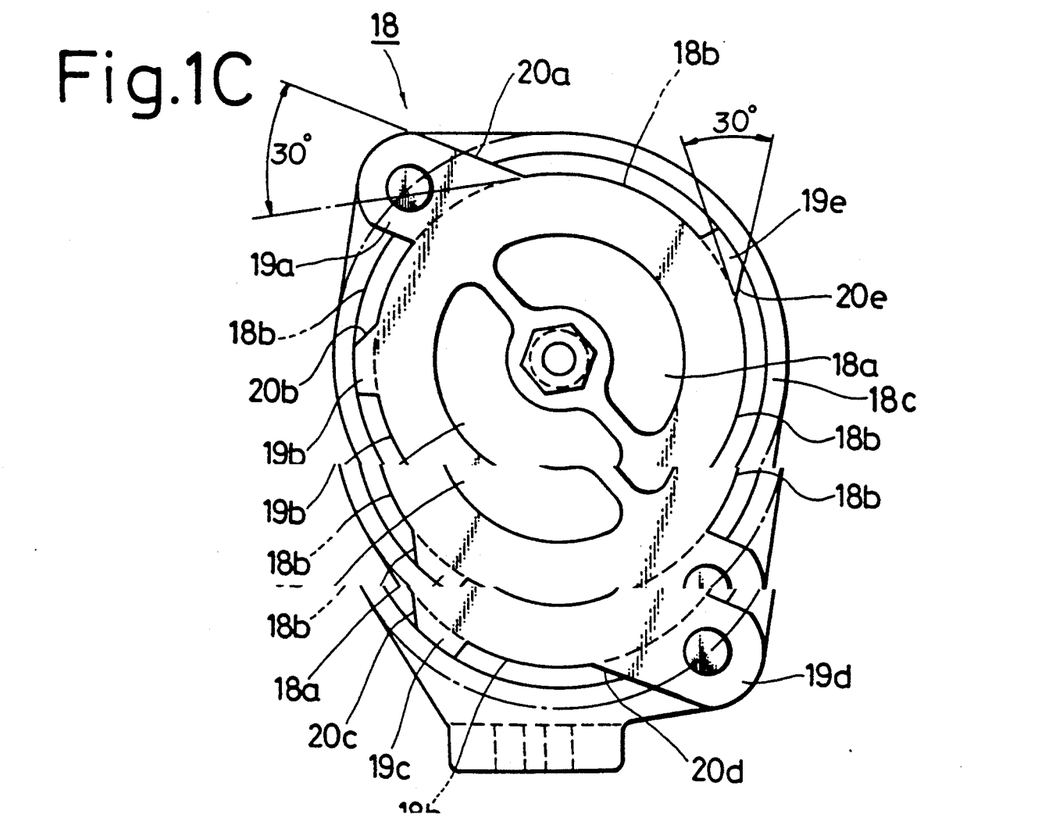
FIG. 1C is a plan view of a housing of the fan unit.
Figure 1D:
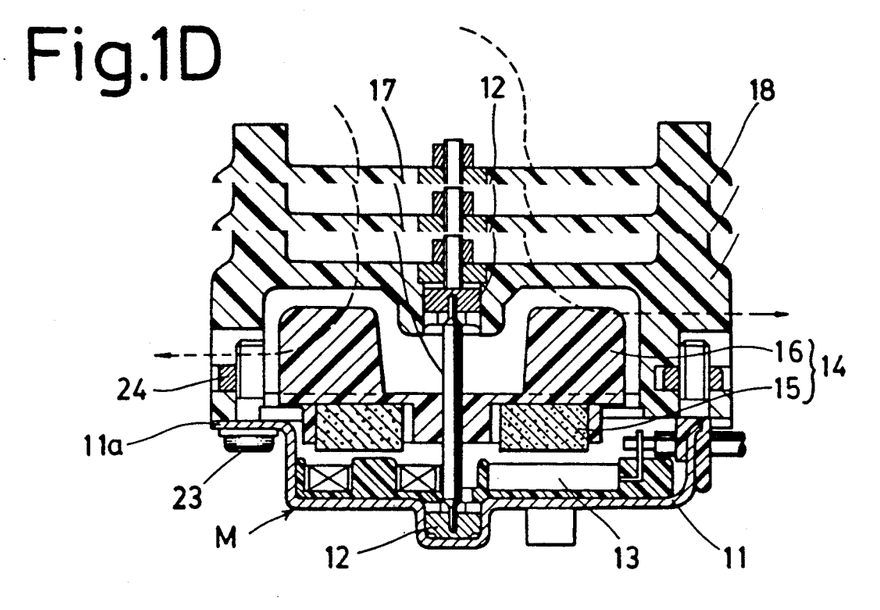
FIG. 1D is a longitudinal cross-sectional view of the fan unit shown in FIG. A.
Figure 1E:
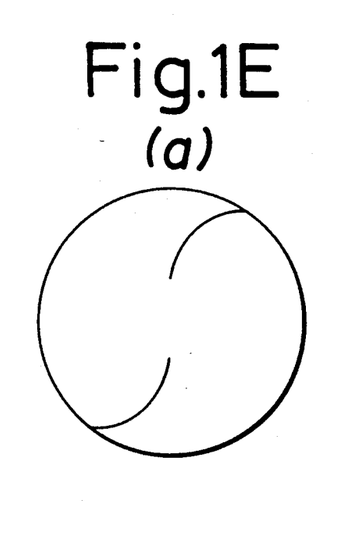

As shown in FIGS. 1A and 1D, a compact automobile fan unit S according to the present invention generally comprises an electric motor M, a turbofan 16 mounted on a drive shaft 17 of the motor M, a yoke 11 covering one side of the fan unit S and containing parts of the motor M, and a housing 18 covering the opposite side of the fan unit S and connected with the yoke 11.

The motor M is a brushless motor and includes, as shown in FIG. 1D, a self-lubricating sleeve bearing 12 fitted in a substantially central recessed retainer portion in the yoke 11 and rotatably supporting one end of the drive shaft 17, a driver circuit 13 mounted on an inside surface of the yoke 11 and including a Hall effect device (not shown), and a rotor assembly 14 concentrically and fixedly mounted on the drive shaft 17 for co-rotation therewith, the opposite end of the drive shaft 17 being rotatably supported on a self-lubricating sleeve bearing, not designated, fitted in a recessed retainer portion in the housing 18. The rotor assembly 14 is composed of a ring rotor magnet 15 confronting the driver circuit 13 on the yoke 11, and the turbofan 16 integrally joined back-to-back with the rotor magnet 15. The yoke 11 has an upper end flange 11a complementary in contour with the shape of a bottom end face 18c (FIG. 1C) of the housing 18 and secured to the bottom end face 18c as described later on. The driver circuit 13 is connected to a pair of lead wires 21 for connection to a power supply, not shown, the lead wires 21 being clamped to the housing 18 by a lead clamp 22.

As shown in FIG. 1B, the turbofan 16 includes a plurality (twelve in the illustrated embodiment) of blades a1 through a12 which are backwardly curved, that is, the blades a1-a12 are curved in a direction opposite to the direction of rotation of the turbofan 16. The backwardly curved blades a1-a12 are circumferentially spaced at different intervals. Stated more specifically, the blade a1 and the blade a2 are circumferentially spaced at an angle of 35 degrees, the blade a2 and the blade a3 are circumferentially spaced at an angle of 32 degrees, the blade a3 and the blade a4 are circumferentially spaced at an angle of 27 degrees, the blade a4 and the blade a5 are circumferentially spaced at an angle of 26 degrees, the blade a5 and the blade a6 are circumferentially spaced at an angle of 31 degrees, the blade a6 and the blade a7 are circumferentially spaced at an angle of 36 degrees, the blade a7 and the blade a8 are circumferentially spaced at an angle of 28 degrees, the blade a8 and the blade a9 are circumferentially spaced at an angle of 25 degrees, the blade a9 and the blade a10 are circumferentially spaced at an angle of 34 degrees, the blade a10 and the blade a11 are circumferentially spaced at an angle of 33 degrees, the blade a11 and the blade a12 are circumferentially spaced at an angle of 24 degrees, and the blade a12 and the blade a1 are circumferentially spaced at an angle of 29 degrees. The turbofan 16 with such inequidistant, backwardly curved blades a1-a12 has a center of gravity located at an axis of the drive shaft.

The above-mentioned arrangement of the blades a1-a12 are obtained by properly combining two different basic blade patterns shown in FIG. 1e(A) and FIG. 1E(b). A first blade pattern shown in FIG. 1E(a) includes two equidistant, backwardly curved blades while a second blade pattern shown in FIG. 1E(b) includes three equidistant, backwardly curved blades. In the embodiment shown in FIG. 1B, the blades a1-a12 of the turbofan 16 are formed of three sets of the first pattern (FIG. 1E(A)) and two sets of second pattern (FIG. 1E(b)) combined together in such a manner that adjacent blades are spaced at different angular intervals as stated above.

The housing 18 is generally cup-shaped and houses therein the turbofan 16. As shown in FIG. 1C, the cup-shaped housing 18 has two intake openings 18a, 18a formed in an end wall thereof, and a plurality (five in the illustrated embodiment) of discharge openings 18b formed in a side wall thereof, the discharge openings 18b being defined between a plurality (five in the illustrated embodiment) of circumferentially spaced side columns 19a through 19e that are jointly constituting the side wall of the housing 18. Two diametrically opposite side columns 19a and 19d are secured to the end flange 11a of the yoke 11 by means of bolts 23 and nuts 24 (FIG. 1D) for connecting the housing 18 and the yoke 11. Each of the side columns 19-19e has an oblique side surface 20a-20e facing in the direction of rotation of the turbofan 16 and sloping in the direction of rotation of the turbofan 16 at an angle of 30 degrees with respect to a tangent line to a circle jointly formed by the outer edges of the respective blades a1-a12. The housing 18 further includes a thrust adjustment mechanism (not designated) associated with the sleeve bearing for adjusting the thrust of the drive shaft 17, as shown in FIG. 1D. The thrust adjustment mechanism comprises an adjust screw threaded through a nut inserted into the end wall of the housing 18 and a lock nut disposed on the nut and threaded over the adjust screw for locking the screw in position against movement.

Figure 2A:
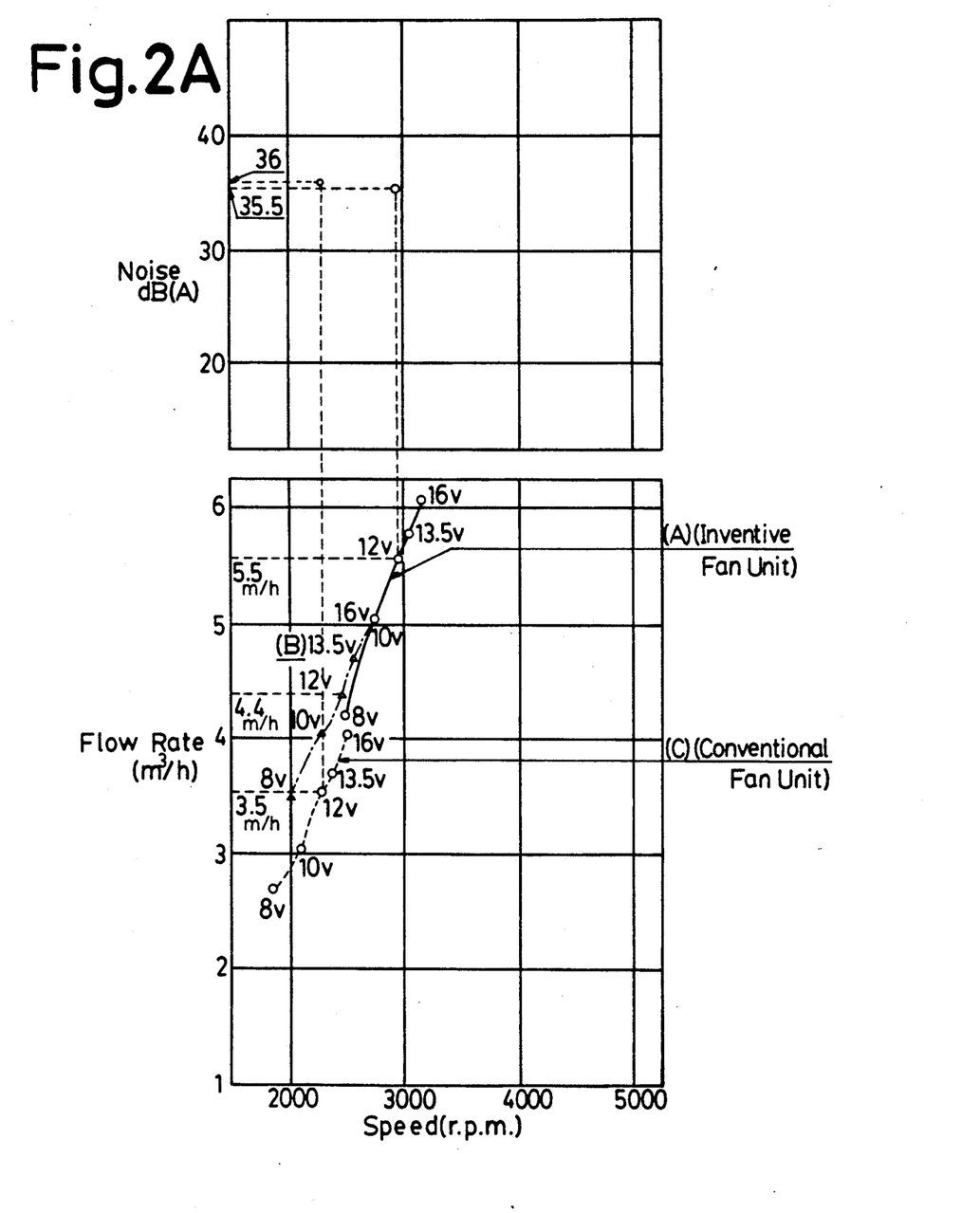
FIG. 2A is a graphical representation of the performance characteristics of the inventive fan unit and a conventional fan unit, illustrating plots of noise versus speed and plots of flow rate versus speed.
Figure 2B:
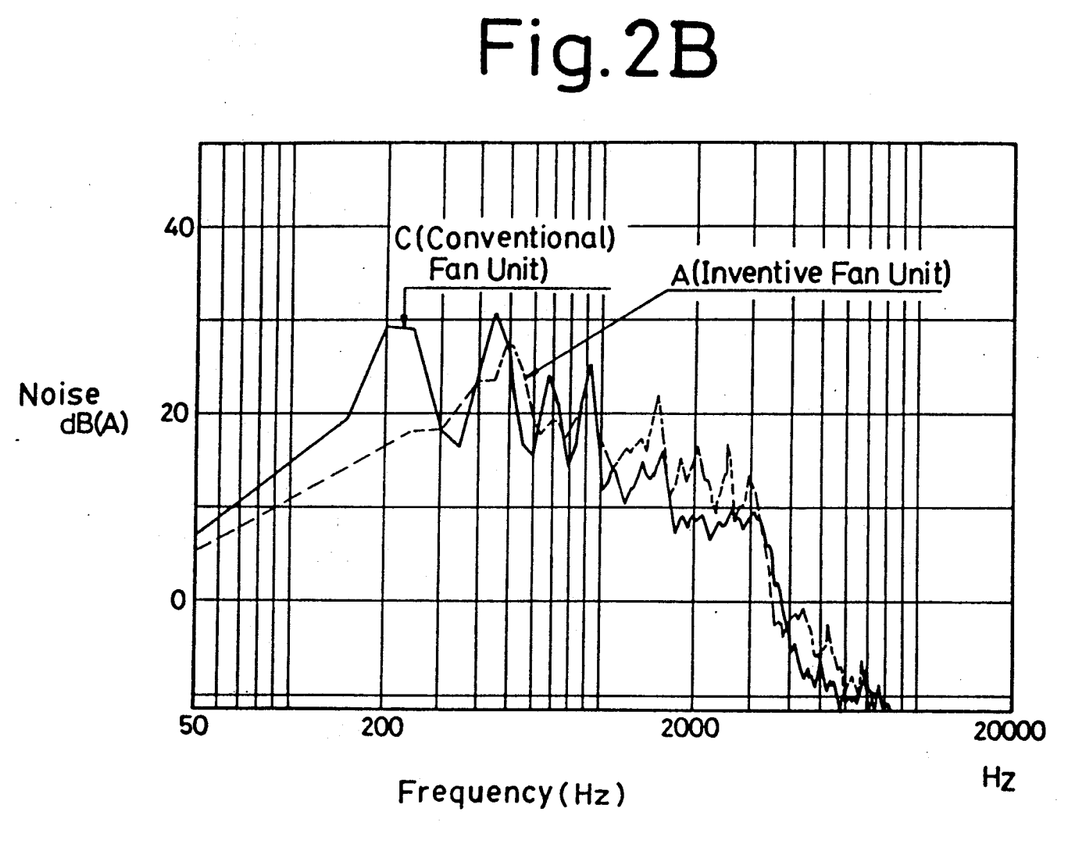
FIG. 2B is a graphical representation of the results of a comparative test for noise frequency of the inventive fan unit and the conventional fan unit.
Figure 2C:
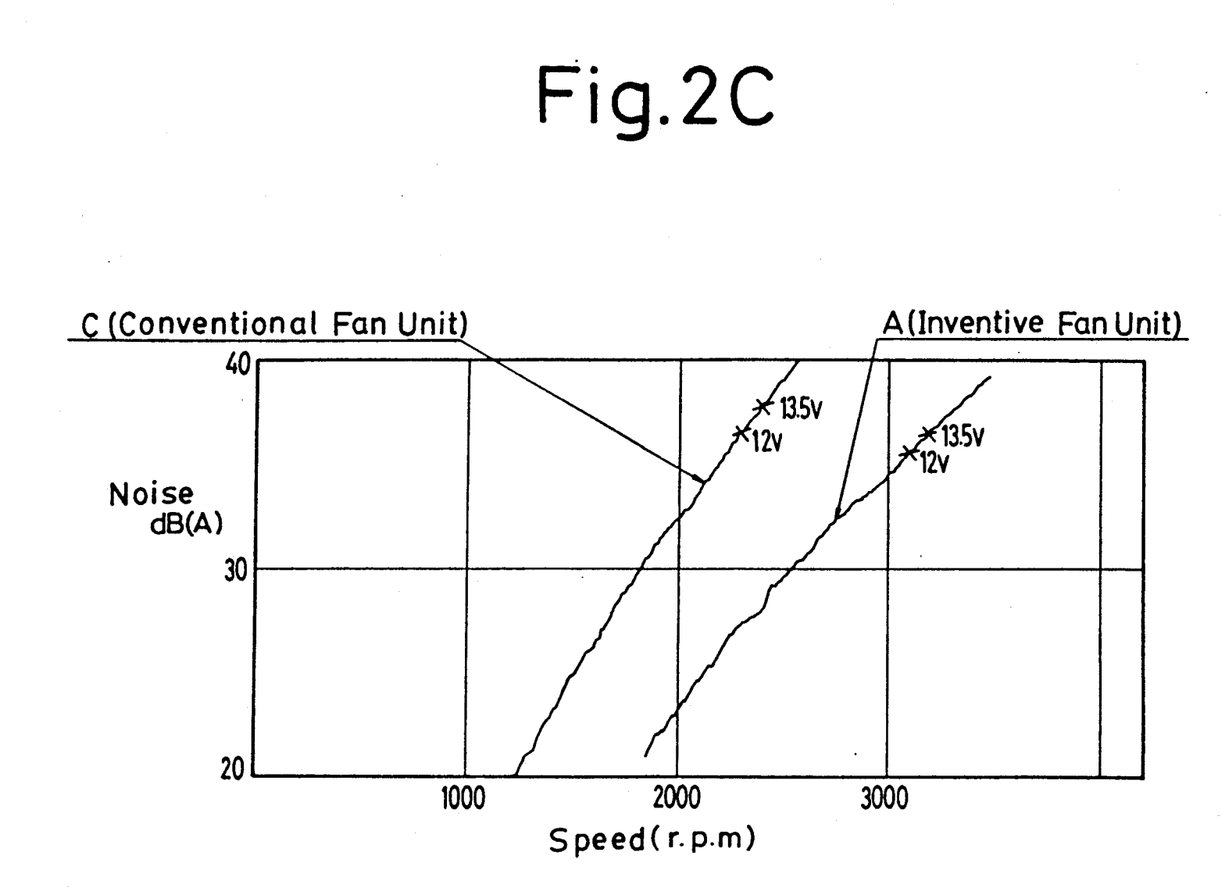
FIG. 2C is a graphical representation of the results of a comparative test for tracking of the inventive fan unit and the conventional fan unit.

The compact fan unit S of the foregoing construction and a conventional fan unit composed of a radial fan having six blades were tested for performance characteristics with the results shown in graphs illustrated in FIGS. 2A-2C.

FIG. 2A illustrates a plot of flow rate versus speed and a plot of noise versus speed taken with respect to each of the inventive fan unit and the conventional fan unit, In FIG. 2A, the solid lines (A) indicate the relation between the flow rate and the speed of the inventive fan unit S when the fan unit S is operating at the same noise level as the conventional fan unit. The dot-and-dash lines (B) indicate the relation between the flow rate and the speed of the inventive fan unit S with respect to different voltages applied to the fan unit S. Likewise, the dotted lines (C) indicate the relation between the flow rate and the speed of the conventional fan unit S with respect to different voltages applied to the fan unit. As evidenced by FIG. 2A, the flow rate of the inventive fan unit S driven at 12V is 4.4 m$^3$/h while the flow rate of the conventional fan unit at the same voltage is 3.5 m$^3$/h, and hence an about 25% increase in flow rate can be obtained at this voltage level. When the inventive fan unit S is driven at substantially the same noise level as the conventional fan unit, the flow rate is increased from 4.4 m$^3$/h to 5.5 m$^3$/h.

FIG. 2B illustrates a plot of noise versus frequency taken with respect to each of the inventive fan unit S and the conventional fan unit. As appears clear from this figure, the noise in a range around 1000 Hz which is most offensive to the ear, the inventive fan unit is substantially the same level as the conventional fan unit.

FIG. 2C illustrates a plot of noise versus speed for showing the tracking characteristic of the test fan units. As evidenced by this figure, the tracking at about 30dB(A) occurs at a speed about 1800 r.p.m. in the conventional fan unit but it does not occur in the inventive fan unit until the speed increases to about 2500 r.p.m.

As described above, the noise level of the present fan unit does not exceed the noise level of the conventional fan unit while the flow rate of the present fan unit esceeds the flow rate of the conventional fan unit by about 50%.

The foregoing advantageous results are obtained partly by inequidistantly spaced fan blades a1-a12 and partly by the sloped side surfaces 20a-20e on the side columns 19a-19e. Owing to the inequidistantly spaced fan blades a1-a12, air led into the housing 18 moves smoothly from the center radially outwardly to the discharge openings 18b without creating a vortex street. With the sloping side surfaces 20a-20e having an angle of inclination of 30 degrees with respect to a tangent line to a circle formed jointly by the outside edges of the respective blades a1-a12, the side columns 19a-19e have a low flow resistance to air and hence do not hinder smooth movement of streams of air being discharged from the fan unit S.

Figure 3:
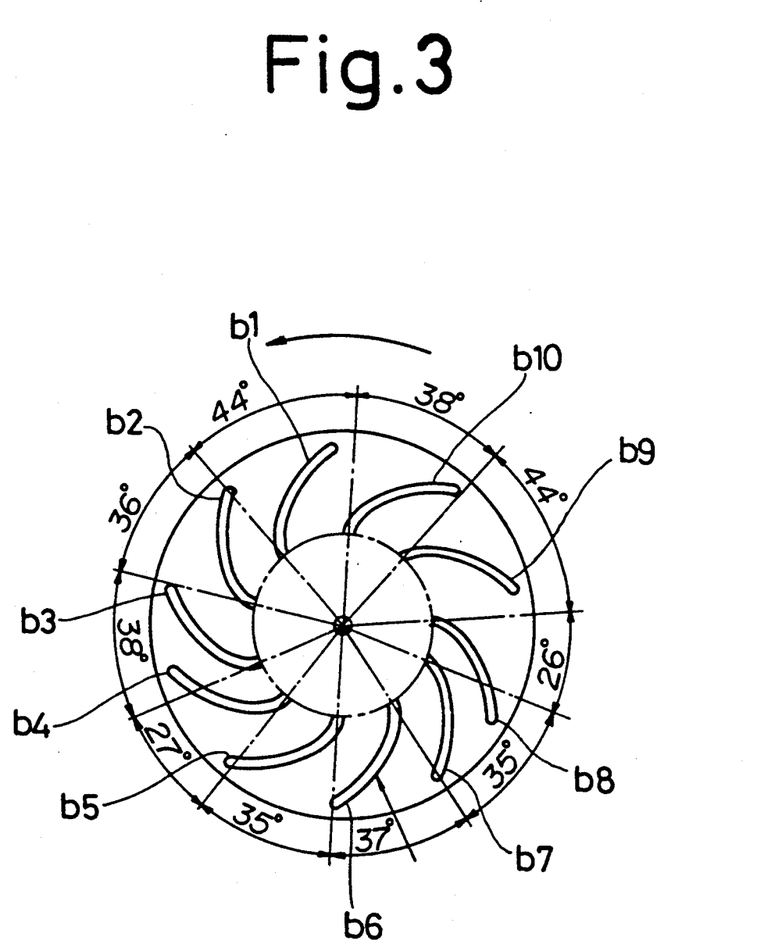
FIG. 3 is a diagrammatical view of a blade design according to another embodiment of the present invention.

FIG. 3 shows an arrangement of blades of a modified turbofan according to the present invention. The modified turbofan is structurally the same as the turbofan 16 of the foregoing embodiment, excepting that the number of blades is ten instead of twelve. The blades b1 through b10 are circumferentially spaced at different angular intervals. Stated more specifically, the blade b1 is spaced from the blade b2 by an angle of 36 degrees, the blade b2 is spaced from the blade b3 by an angle of 38 degrees, the blade b3 is spaced from the blade b4 by an angle of 27 degrees, the blade b4 is spaced from the blade b5 by an angle of 35 degrees, the blade b5 is spaced from the blade b6 by an angle of 37 degrees, the blade b6 is spaced from the blade b7 by an angle of 35 degrees, the blade b7 is spaced from the blade b8 by an angle of 26 degrees, the blade b8 is spaced from the blade b9 by an angle of 44 degrees, the blade b9 is spaced from the blade b10 by an angle of 38 degrees, and the blade b10 is spaced from the blade b1 by an angle of 44 degrees. The center of gravity of the modified turbofan is coincident with the axis of rotation of the turbofan.

With the fan blades b1-b10 thus arranged, a substantial reduction of noise and vibration is achieved when the modified fan unit is operating at the same speed as the conventional fan unit.

Obviously, various modifications and variations of the present invention are possible in the light of the above teaching. It is therefore to be understood that within the scope of the appended claims the invention may be practiced otherwise than as specifically described.

PARTS LIST

S: fan unit
M: motor
11: yoke of M
11a: flange of 11
12: sleeve bearing
13: driver circuit of M
14: rotor assembly of S
15: rotor magnet
16: turbofan
a1-a12: blade of 16
b1-b10: blade of turbofan (FIG. 3)
17: drive shaft of M
18: housing
18a: intake opening in 18
18b: discharge opening in 18
18c: bottom surface of 18
19a-19e: side column of 18
20a-20e: oblique side surface on 19a-19e
21: lead wire
22: lead clamp
23: bolt
24: nut

What is claimed is:

1. A compact automobile fan unit comprising:
   (a) a motor having a yoke and a drive shaft rotatably supported at its one end by said yoke;
   (b) a turbofan fixedly mounted on said drive shaft for co-rotation therewith and having a plurality of blades curving in a direction opposite to a direction of rotation of said turbofan, said blades being circumferentially spaced at different angular intervals, said turbofan having a center of gravity located at an axis of said drive shaft, and said blades being arranged in a pattern defined by a combination of a pair of blades circumferentially equidistant from one another and a set of three blades circumferentially equidistant from one another; and
   (c) a substantially cup-shaped housing connected to said yoke of said motor and containing said turbofan, said housing including an end wall having at least one intake opening and a side wall having at least one discharge opening.

2. A compact automobile fan unit according to claim 1; wherein the number of said blades is twelve, said twelve blades being arranged in a pattern defined by a combination of three said pair of blades and two said set of three blades.

3. A compact automobile fan unit according to claim 1; wherein the number of said blades is ten, said ten blades being arranged in a pattern defined by a combination of two said pair of blades and two said set of three blades.

4. A compact automobile fan unit according to claim 1; wherein said housing includes a plurality of circumferentially spaced side columns defined therebetween said discharge opening, each of said side columns having an oblique side surface sloping in the direction of rotation of said turbofan.

5. A compact automobile fan unit according to claim 4; wherein said sloped side surface extends obliquely at an angle of about 30 degrees with respect to a tangent line to a circle defining an outside diameter of said turbofan.

6. A compact fan unit comprising:
   a housing having at least one intake opening for admitting air into the housing and at least one discharge opening for discharging air from the housing;
   a rotatable drive shaft disposed inside the housing and supported at both ends by the housing;
   a plurality of fan blades connected to the drive shaft in a pattern defined by a combination of a pair of blades circumferentially equidistant from one another and a set of three blades circumferentially equidistant from one another; and
   drive means disposed inside the housing for rotationally driving the drive shaft to thereby rotate the fan blades causing air to be drawn into the housing through the intake opening and discharged from the housing through the discharge opening.

7. A compact fan unit according to claim 6; wherein the housing has an oblique side surface at the trailing end of each discharge opening with respect to the direction of rotation of the fan blades, the oblique side surface extending outwardly from the discharge opening in a direction which is at a given angle with respect to a tangent line to a circle defining the locus of the outer ends of the fan blades.

8. A compact fan unit according to claim 7; wherein the given angle is approximately 30°.

9. A compact fan unit according to claim 6; wherein the fan blades are twelve in number, the twelve blades being arranged in a pattern defined by a combinationn of three of the pair of blades and two of the set of three blades.

10. A compact fan unit according to claim 9; wherein the circumferential distance between each two adjoinng fan blades is different from that between all other two adjoining fan blades.

11. A compact fan unit according to claim 6; wherein the fan blades are ten in number, the ten blades being arranged in a pattern defined by a combination of two of the pair of blades and two of the set of three blades.

12. A compact fan unit according to claim 11; wherein the circumferential distance between each two adjoining fan blades is different from that between all other two adjoining fan blades.

13. A compact fan unit according to claim 6; wherein the drive means comprises a rotary electric motor connected to rotationally drive the drive shaft, and a control circuit for controlling the application of electric power to the motor.

14. A compact fan unit according to claim 13; wherein the rotary electric motor comprises a brushless motor.

15. A compact fan unit according to claim 13; wherein the rotary electric motor includes a rotatable rotor assembly integrally connected to the fan blades to undergo co-rotation therewith.

16. A compact fan unit according to claim 9; wherein the circumferential distance between each two adjoining fan blades is different from that between all other two adjoining fan blades.

* * * * *